United States Patent
Aslam (10) Patent No.: US 12,446,573 B2
(45) Date of Patent: Oct. 21, 2025

(54) TUNABLE, SIMPLE, HIGHER-YIELD, HIGHER-RATE, LOWER-COST RECOVERY METHOD OF BIOPHARMACEUTICAL PRODUCTS FROM CELL FACTORIES

(71) Applicant: Naveed Aslam, Bellaire, TX (US)

(72) Inventor: Naveed Aslam, Bellaire, TX (US)

(73) Assignee: GPS Innovations, Bellaire, TX (US)

( * ) Notice: Subject to any disclaimer, the term of this patent is extended or adjusted under 35 U.S.C. 154(b) by 0 days.

(21) Appl. No.: 16/974,427

(22) Filed: Feb. 1, 2021

(65) Prior Publication Data
US 2022/0240498 A1    Aug. 4, 2022

(51) Int. Cl.
*A01N 1/125*    (2025.01)

(52) U.S. Cl.
CPC ..................... *A01N 1/125* (2025.01)

(58) Field of Classification Search
CPC ............... A01N 1/0221; C12M 47/06
See application file for complete search history.

(56) References Cited

U.S. PATENT DOCUMENTS

2015/0361457 A1*  12/2015  Medoff .................. C07C 31/12
                                                                 435/141

FOREIGN PATENT DOCUMENTS

| CN | 104783175 A | * | 7/2015 | ............ A21D 2/165 |
| EP | 2977439 A1 | * | 1/2016 | ............ C12M 47/06 |
| WO | WO-2011119753 A2 | * | 9/2011 | ............ C02F 11/06 |
| WO | WO-2020020929 A1 | * | 1/2020 | ......... B01D 11/0284 |

OTHER PUBLICATIONS

Broekman et al. An improved method for isolating alpha granules and mitochondria from human platelets. Journal of Cell Biology 1974, 60;507-519. (Year: 1974).*
Abbassi et al. Temperature dependency of cell wall destruction of microalgae with liquid nitrogen pretreatment and hydraulic pressing. Algal Research 2014, 5;190-194. (Year: 2014).*
CN 104783175 A, machine translation. (Year: 2015).*
Sun et al. Effect of Hg2+ on the microphysical and chemical properties of oil-producing *Nannochloropsis* sp. Algal Research 2021, 60:102525. (Year: 2021).*
Thommes et al. Physisorption of gases, with special reference to the evaluation of surface area and pore size distribution (IUPAC Technical Report). Pure and Applied Chemistry 2015, 87;(9-10): 1051-1069. (Year: 2015).*

* cited by examiner

*Primary Examiner* — Christopher M Babic
*Assistant Examiner* — Jennifer S Spence
(74) *Attorney, Agent, or Firm* — Woods Oviatt Gilman LLP; Trent V. Bolar, Esq.

(57) ABSTRACT

A simpler and lower-cost method and associated hardware are described for recovering biopharmaceutical products from cell factories in higher yields by a liquid nitrogen-based pre-treatment of cell factories followed by gentler disintegration of cellular factories by tunable, pressurizing and de-pressurizing cycle with gaseous nitrogen. The cell factories are heterologous expression systems and could be based on plant cells, mammalian cells, algal cells, yeast cells or even bacterial cells. The pre-treatment step with liquid nitrogen softens the tougher cell wall structures thus enabling cells to be disrupted relatively easily during the gaseous nitrogen-based pressurizing/depressurizing cycle. This invention can enhance the yield of biopharmaceutical products from expression systems and reduce the overall cycle-time and further down-stream processing and polishing cost of biopharmaceutical products.

20 Claims, 8 Drawing Sheets

TUNABLE, SIMPLE, HIGHER-YIELD, HIGHER-RATE, LOWER-COST RECOVERY METHOD OF BIOPHARMACEUTICAL PRODUCTS FROM CELL FACTORIES

RELATED APPLICATIONS

NOT APPLICABLE.

FIELD OF THE INVENTION

The present invention relates to the recovery of biopharmaceutical products from heterologous cellular expression systems.

BACKGROUND OF THE INVENTION

The following discussion is provided solely to assist the understanding of the reader, and does not constitute an admission that any of the information discussed or references cited constitute prior art to the present invention.

Biopharmaceuticals are of great value and interest, but these medicinal proteins cannot be extracted in large quantities from biological sources, such as human blood or helminth secretions. Currently, most biopharmaceutical proteins are produced through recombinant DNA technology. This technology is based on the introduction of gene of interest into a host organism that can be cultured easily to produce significant amount of target proteins. Expression of the gene of interest in a host system enables the production of target proteins by heterologous system "from one species to another". The host could be based on plant cells, mammalian cells, yeast cells, bacterium cells or algal cell systems. This technology has revolutionized the production and application of biopharmaceutical proteins. Biopharmaceuticals approved by the US Food and Drug Administration (FDA) and European Medicines Agency (EMA) from 2004 to 2013 are largely derived from mammalian cell (56%); E. coli (24%); S. Cerevisiae (13%); Transgenic animals & plants (3%) and insect cells (4%)

Currently, several heterologous expression systems are used to produce biopharmaceutical products. The majority of approved biopharmaceuticals for human use are produced in bacterium E. coli, the yeast Saccharomyces cerevisiae or mammalian cell lines, like CHO or murine myeloma (SP2/0) cells. Despite extensive experience and production scale utilization of these expression systems careful considerations are required when choosing a specific expression system for specific application. For example, E. coli allows the most cost-effective production of biopharmaceuticals but as a prokaryote is not able to produce complex proteins, also formation of large protein aggregates is a common feature in E. coli expression systems. The proteins obtained from E. coli. required to be refolded for obtaining their active state and E. coli is also not able to perform complex post-translational steps like N-glycosylation. Yeasts are easy and cheap to culture and are capable of producing glycoproteins however, yeasts produce mannose-enriched N-glycine and have the tendency to hyper-glycosylate. Mannose-enriched proteins could have reduced half-life in the blood stream due to quick clearance. Therefore, mannose-enriched N-glycans are therefore mostly not preferred on pharmaceutical glycoproteins.

The human biopharmaceutical proteins can also be alternately produced from plant cell cultures. The plant cell cultures offer several advantages over mammalian cell cultures, including cost-effectiveness and potent lack of any mammalian derived components in the production process. Additionally, in the plant cell systems precise control over growth could be exerted leading to high batch-to-batch reproducibility and, therefore, comply with current good manufacturing practice (cGMP). The main advantage of plant systems is the ability to offer lower cost. It is estimated that production cost of recombinant proteins in plants could be 10-50 times lower than producing the same proteins in E-coli. Another estimate shows plant proteins could be 1000-times cheaper than proteins from CHO systems.

Plants therefore, provide an economically sound source of biopharmaceuticals. Furthermore, using the existing infrastructure of crop cultivation, processing and storage will reduce amount of capital investment required for commercial production. The main advantages of using plant cells as a platform for biopharma products are: 1. Ability to assemble complex multimeric proteins such as antibodies; 2. Possibility to achieve post-translational modifications similar to those found in mammalian cells; lower management costs; ease of scalability.

The plant cell cultures have certain disadvantages: 1. One of the major factors limiting the wide-spread adaptability of plant expression systems is extensive downstream processing requirements, almost 80-90% costs associated with plant-based biopharmaceuticals are due to downstream processing costs; 2. Lower final yield of recombinant antibodies from plant cells due to uncontrolled proteolytic processes; 3. Glycosylation patterns of plant-based proteins. Some of the references for cellular dis-integration methods are described below.

Loewus, M. W. and Loewus, F., 1971. "The isolation and characterization of d-glucose 6-phosphate cycloaldolase (NDAdependent) from *Acer pseudoplatanus* L. cell cultures. Plant Physiol. (1971) 48:255-260. Loewus, and Loewus describe the application of nitrogen disruption procedures to plant cells and to tissue cultured plant cells. They also report considerable success in breaking diatoms by this method.

Manson, L. A., 1972 "Extraction of membranous transplantation antigens by pressure homogenization." (Ed. Kahan, B. D. and Reiifeld, R. A.) Chapt. 9, oyransplantation Antigens. Published by Academic Press, New York. Manson used high pressure homogenization to do cell disintegration.

Yuchong Wang, Kathryn S. Lilley and Stephen G. Oliver. 2014. A protocol for the subcellular fractionation of *Saccharomyces cerevisiae* using nitrogen cavitation and density gradient centrifugation Yeast 2014; 31: 127-135. Wang et. al. 2014 developed a highly reproducible method of homogenizing yeast cells based on nitrogen cavitation.

Hunter, M. J. and Commerford, S. L., 1961, "Pressure homogenization of mammalian tissues." Biochim. Biophys. Acta, 47:580-6. Hunter and Commerford (1) published a paper in 1961 which has become a basic "cookbook" for the disruption of mammalian tissue by the nitrogen decompression method.

Dowben, R. M., Gaffey, T. A. and Lynch, P. A., 1968. "Isolation of liver muscle polyribosomes in high yield after cell disruption by nitrogen cavitation." FEBS Letters, Vol. 2, No. 1, pages 1-3; Dowben, R. M., Lynch, P. M., Nadler, H. C. and Hsia, D. Y., 1969. "Polyribosomes from L. Cells." Exp. Cell Research, 58:167-9. Dowben, Gaffey and Lynch (1968-1969) used the nitrogen decompression technique to prepare polyribosomes from L Cells, fibroblasts, human fetal cells from amniotic fluid, rat livers and muscle from chick embryos. Using 600 psi pressure they obtained better than 99.9% rupture and recovered more than 95% of the nuclei intact. Polysome yield was two to three times greater than when the cells were homogenized in a Dounce tissue grinder. In addition, they had better define and more reproducible profiles. Significantly greater activities as measured by amino acid incorporation were also reported.

Following references describe some more methods of cellular disruption:

[1] Short, C. R., Maines, M. D. and Davis, L. E., 1972. "Preparation of hepatic microsomal fraction for drug metabolism studies by rapid decompression homogenization." Proc. Soc. Exper. Biol. Med., 140:58-65.
[2] Wallach, D. F. H., Soderberg, J. and Bricker, L., 1960. "The phospholipides of Ehrlich and ascites carcinoma cells composition and intracellular distribution." Cancer Research, 20:397-402.
[3] Manson, L. A., Foshi, G. V. and Palm, J., 1963. "An association of transplantation antigens with microsomal pipoproteins of normal and malignant mouse tissues." J. Cell and ComD.
Physiol., 61:109-18.
[4] Fraser, D., 1951. "Bursting bacteria by release of gas pressure." Nature, 167:33-4.
[5] Avis, P. J. G., 1967. "In subcellular components, preparation and fractionation." (Ed. Birnie, G. D. and Fox, S. M.) Chapt. 1, Pressure homogenization of mammalian cells. Published by Plenum Press, New York.

SUMMARY OF THE INVENTION

Cellular disruption is a method in which the outer boundary or cell membrane is broken down or destroyed in order to release inter-cellular materials such as DNA, RNA, protein or organelles from a cell factory. Cell disruption is an important unit operation for recovery of biopharmaceutical products from heterologous expression systems. It can be also a key step in the molecular diagnostics of pathogens, immunoassays for point of care diagnostics, down streaming processes such as protein purification for studying protein function and structure, cancer diagnostics, drug screening, mRNA transcriptome determination and analysis of the composition of specific proteins, lipids, and nucleic acids individually or as complexes. Based on the application, cell lysis can be classified as complete or partial. Partial cell lysis is performed in methods like patch clamping, which is used for drug testing and studying intracellular ionic currents. In this technique, a glass micropipette is inserted into the cell, rupturing the cell membrane only partially and recovering the key target. Complete cell lysis is the full disintegration of cell membrane and is usually required for obtaining higher yield of biopharmaceutical products from expression systems. There are several cell disruption methods such as mechanical homogenizers, sonication, enzymatic, chemical, grinding, and osmotic shock are currently employed at industrial scale to disrupt the cellular systems. However, all these methods are characterized by lower yield, higher cost, complex processing, loss of product, and longer cycle time. The present invention is directed to overcoming those complications and limitations by providing a simpler, direct method for recovering biopharmaceutical products from cell factories. This allows tougher cell wall expression systems like plant cells and algal cells to be used as a source for synthesizing biopharmaceutical products much more safely and at lower cost, making practical the utilization of existing infrastructure such as in agriculture sources which were difficult or impractical to utilize previously to in-situ grow biopharmaceutical proteins.

The method defined hem provide a global solution for cell disruption. Thus, it means that method can be applied to all type of cell systems including plant cells, algal cell, mammalian cells, yeast cells, bacterial cells, insect cells without any change in the hardware configuration.

The method involved here also provide a continuous processing system which could be of a significant value to reduce labor and capital expenditures currently involved in the batch processing of biopharmaceutical products.

The method involved here will lower the down-stream processing costs of biopharmaceuticals in a multitude of expression systems. Usually 60-90% of biopharmaceutical costs are locked into downstream processing. The current method with its simpler approach and continuous configuration can significantly reduce the current costs involved in biopharmaceutical processing. For example, currently plant cells are very difficult to be processed due to tough cell wall structure however, current method can provide a simple way to handle plant cells and as rule of thumb plant cells are 10-50 times cheaper than *E-coli* and 1000-times cheaper than CHO cell systems.

The method involved also provide unique process configuration, particularly including a continuous pre-treatment step of LN2 spray on the layer of cell factories to make their cell wall more amenable to dis-integration. A part of the invention further provides a method of gentler disintegration of cell factories through tunable pressurization/depressurization cycle. The pressurization is accomplished by GAN generated in the pre-treatment step. The pressurization is kept to lower range from 100-800 psi due to pre-treatment step which assists the disintegration of even tougher cell wall systems such as plant cells and algal cells at relatively lower pressures.

Figure 7:
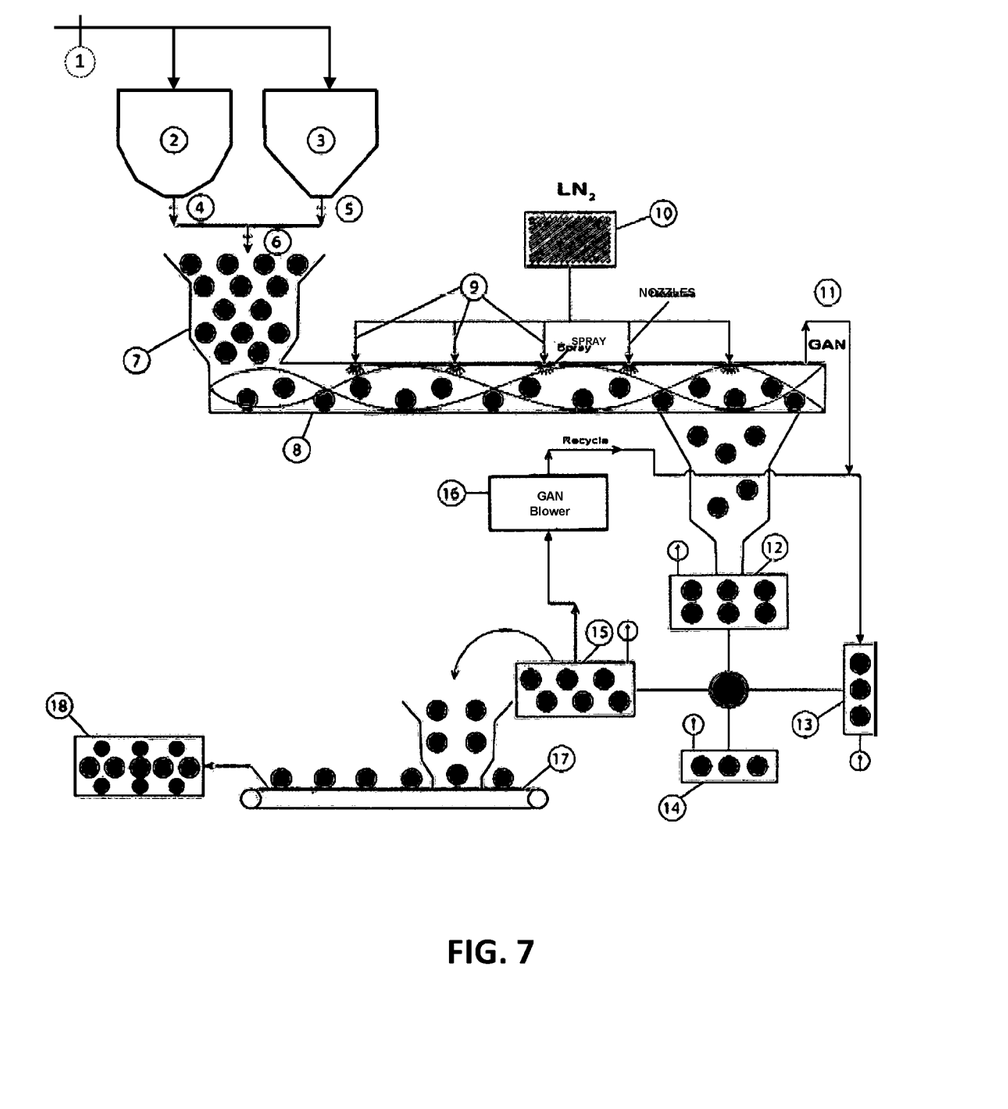
FIG. 7 is a diagram of a modular, simpler, universal, tunable, lower-cost, higher yield and continuous process for disruption of plant, mammalian, algal, yeast, bacterial and insect cells through LN2 spray pretreatment followed by lower pressure disintegration by pressurization/depressurization cycle with inert gas such as nitrogen or argon.

Thus, a first aspect of the invention concerns a method for pre-treating the cell factories such as expression systems from plant, algal, bacterial, mammalian, yeast, or insect source with a continuous spray of LN2, and a second step of pressurizing pre-treated cells with GAN followed by depressurization. The pressurization/de-pressurization cycle can be repeated few times depending on the cell expression system. The first step is performed in a spray chamber where cells are transported on a helical screw (e.g., helical screw 750) or a conveyor belt (e.g., conveyor belt 710). The second step is performed in pressure vessel where four vessels are used to be alternating between filling, pressurization, depressurization and emptying. For example, depressurization can be accomplished in 5 minutes, 10 minutes, 15 minutes, or 15-30 minutes. Thus, ensuring continuous processing.

Large leaf surfaces are generated in plants that act as two-dimensional solar panels with a minimum investment in building material, thanks to a hydrostatic skeleton. This requires high intracellular pressures (up to 1 MPa), which depend on the presence of strong cell walls. The walls of growing cells (also called primary walls), are remarkably able to reconcile extreme tensile strength (up to 100 MPa) with the extensibility necessary for growth. All walled organisms are confronted with this dilemma—the need to balance strength and extensibility—and bacteria, fungi and plants have evolved independent solutions to cope.

In particular embodiments, the method described in this invention is a dual function process. It includes two different steps for the processing of biopharmaceutical bearing cells. The first function of this method is to soften tougher cell wall of cells like plant cells through a spray of liquid nitrogen and second function of this method is to carry out the dis-integration of pre-treated plant or animal cells at relatively lower pressures. This will reduce the energy requirements for cell disruption and enhance the yield as most of the desirable products will be obtained without going through degradation or product loss due to aggregation.

In advantageous embodiments, the dual function process includes a liquid nitrogen (LN2) pre-treatment; the dual function method includes a LN2/GAN which catalyzes transformation of expression system cells in such a way to provide intracellular products at higher yields; the dual function process includes an LN2 pre-treatment step and a lower-pressure cell dis-integration step which stimulates the transformation of cell wall and overall cellular structure in such a way that intracellular products like proteins, lipids or organelles are obtained without undergoing through degradation and aggregation which is usually observed in high-pressure cellular disintegration steps like mechanical pressing. Thus, this method provides a lower intensity and lower energy foot print alternative of existing higher-pressure or chemical technologies to accomplish cellular disruption for heterologous expression systems. In particularly advantageous embodiments, the dual functional process is a combination of LN2 pre-treatment which catalyzes the transformation of cellular boundaries to softer state, and lower pressure dis-integration step which induces the disruption of cellular systems to cellular debris and higher yield cellular products such as lipids and proteins.

In certain embodiments, the heterologous expression system cells are plant cells, mammalian cells such as Chinese hamster Ovary (CHO) cells, bacterial cells, yeast cells and microalgae cells; the method is carried out using a high purity gaseous nitrogen or argon for pressurization/depressurization cycle of cellular disruption.

Advantageously in some embodiments, the method is carried out at 1 to 2 atm, 2 to 6 atm, 2 to 5 atm, 5 to 8 atm, or 5 to 10 atm; the method is carried out at −30 to −20, −20 to −10, −10 to −4, −4 to 0, 0 to 4, 4 to 10, 10 to 25, 10 to 30, 10 to 20, 20 to 40, or 10 to 40 degrees C.; the method is carried out at a combination of pressure and temperature which is a combination of any of the pressure ranges and any of the temperatures ranges just specified, e.g., a pressure of 1 to 10 atm and a temperature of −30 to 10 degrees C.

A related aspect concern is carrying out this process continuously. The pre-treatment and cell disruption steps of this methods are carried out continuously thus providing advantage of higher throughput better yield, lower labor cost, better consistency and control Additional embodiments will be apparent from the Detailed Description and from the claims.

DETAILED DESCRIPTION OF THE PREFERRED EMBODIMENTS

A. General Description of Invention

Over the bioreactor-based production of biopharmaceutical, the transgenic sources i.e., plants and animals offer numerous advantages the most important ones are the ease and the associated low cost for large-scale production. According to certain reasonable estimates the unit cost of producing recombinant drug from transgenic plants is only 10-20% compared to fermentation-based methods. For the case of monoclonal antibodies (MAbs) depending on the scale of production the total cost via mammalian cell cultures could be in the range of 140 $/g to 450 $/g. Usually 20-40% of this cost is the production of protein and the rest is for recovery, purification and polishing. In contrast, the cost estimates for producing a drug in transgenic crop are 9 to 15 $/g. Therefore, any method which can enhance the yield and reduce the cost of extraction of proteins from expression system either it be a mammalian cell or plant cell could be useful for further commercialization of biopharmaceutical products.

Transgenic plants offer additional advantages, such as plants do not carry human pathogens; this is an advantage nut only from the process economy point of view but also from a regulatory and safety perspective. Processes for protein purification from expression systems such as cell culture and transgenic animal product usually include extra steps for clearance of pathogens, such as chromatographic or membrane separation methods, which add to the total process cost. Many proteins have been targeted for production in transgenic sources; these proteins range from monoclonal antibodies (MAbs), enzymes, blood proteins, to various subunit vaccines.

For the last two decades the use of plants for recombinant protein production has been actively pursued. The plant species used include tobacco, carrot, tomato, maize, potato, alfalfa, soybean, rice, canola, and spinach. Due to food safety concerns it seems among all plants, tobacco may face the least regulatory resistance and public scrutiny; and thus, it may be the most promising plant candidate in future plant-based biopharmaceutical production.

Before the oil extraction from microalgae cell wall disruption is needed in order to break down the tougher and stronger cell wall and to enhance the release and recovery of intracellular lipids for biodiesel production. Due to their strong cell wall structures microalgae require significant energy input with extreme pressure conditions. The method propose here provides a facile process to treat the microalgae cell wall with liquid nitrogen and then use pre-treated cells in a gentler GAN based process to disrupt cells at relatively lower pressure (100-500 psi) thus reducing the unit energy input for the treatment of microalgae and enhance the yield of extraction.

This invention also describes a process based on LN2 and GAN or other inert gas like Argon to produce Insulin from cell factories. The incidence of diabetes is increasing at an alarming rate and it has been speculated that the number of diabetic patients worldwide would increase to approximately 300 million by year 2025. Consequently, the requirements for insulin will increase many times i.e., approximately 1600 kg/yr. It seems that the productivity of current insulin expression system would not be sufficient to meet the future market demands. Therefore, the efficient expression systems for insulin production are also needed and novel routes for insulin administration such as oral or inhalation are to be developed. Recombinant protein-based drugs, produced by various expression systems are getting attention. Among prokaryotes, *Escherichia coli* has always been offered several advantages including high growth rate, simple media requirements, easy to handle, high yield and very cost effective. However, there are some disadvantages using *E. coli* expression system, such as loss of plasmid and antibiotic property, unsolicited inducers for gene expression, intracellular accumulation of heterologous proteins as inclusion bodies, improper protein refolding, lack of pos-translational modification, protein-mediated metabolic burden and stress, endotoxin contamination, poor secretion, proteolytic digestion and complexity in downstream processing. Thus, it seems that yeast expression system would provide a better expression system for production of insulin compared to *E. coli* and mammalian cell systems due to cost and quality of insulin obtained. Yeast based systems grow rapidly and are very easy to handle and amenable to various genetic manipulations. The recombinant insulin produced in yeast could be very similar to produce in mammalian cells. Yeast cells like *Saccharomyces cerevisiae* has been extensively used to produce recombinant insulin since early 1980 and large production of recombinant insulin are produced by this yeast expression system. Though this yeast system is characterized by very tough cell walls which require extensive treatment like high pressure press to rupture these walls and then another high pressure or chemical-based system to extract the insulin out of ruptured cells. The current methods are slow and are characterized by poor yield. This invention suggests that yeast cell be treated with LN2, the treatment with LN2 will soften the cell walls of insulin bearing *Saccharomyces cerevisiae* and the treated cells are then treated with GAN through a pressure and depressurization cycle thus providing a shock wave stimulation for gentler and more complete extraction of insulin from the yeast cells without losing the quality. This combined LN2-GAN based system could be economical, scalable, faster and efficient in producing insulin from yeast-based cell factories.

B. Description

As mentioned above, the use of the described process system to carry out the disintegration of cellular factories into useful products like insulin, MAbs, lipids, DNA, carotenoids, oils and proteins can advantageously be carried out in a process as described in a process outline FIG. 7. This LN2-GAN based process is specifically designed to provide intracellular products from expression systems with high yield and in a continuous manner, thus lowering the cost and reducing the cycle time.

Figure 5:
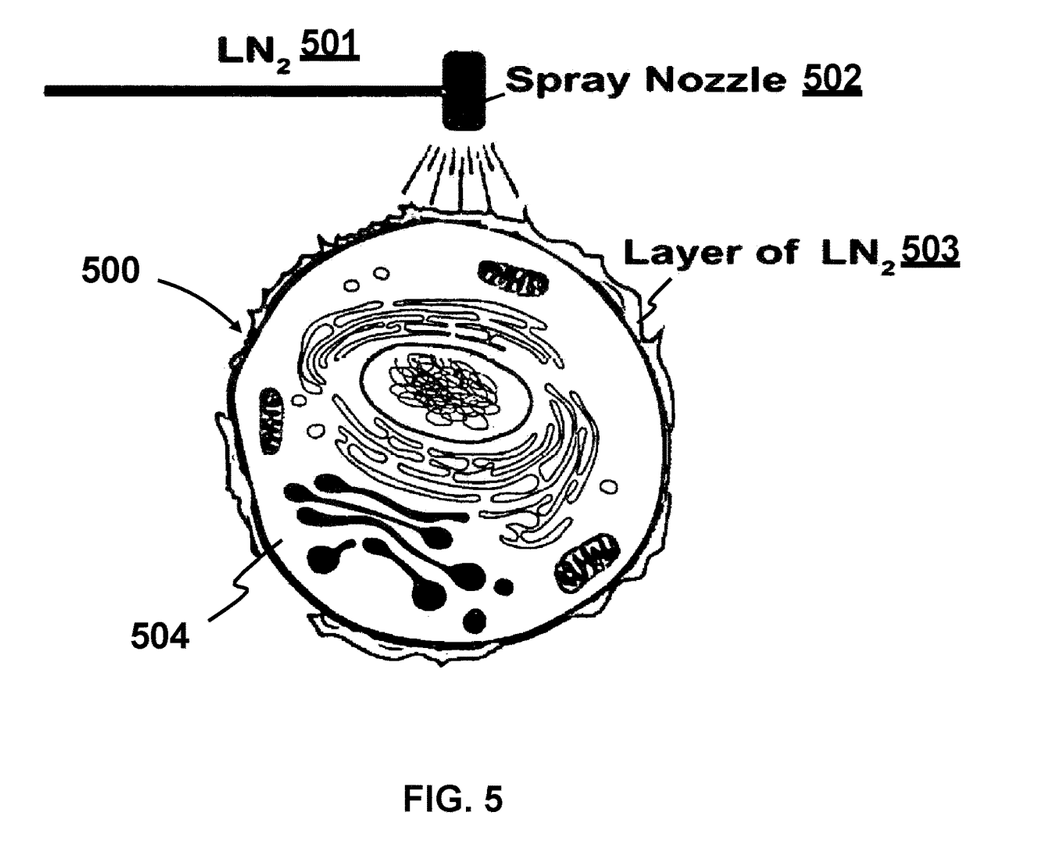
FIG. 5 is a diagram of an LN2 spray of a mammalian cell type to aid in gentler cell disintegration

Currently, there are three strategies employed to produce recombinant proteins from plant systems: cell cultures; plant-tissue based systems; transgenic plants. The usage of plants for biopharmaceutical production has the potential to increase the yield/production and reduce the cost. Plant cell factories can have several advantages over their animal counterparts such as safety, cost, yield, throughput, stability and buffering capability to minor process perturbations. However, the current methods of downstream processing of plant cell factories reduce the yield of recombinant proteins due to certain innate degradation processes in the plant cell. The pre-treatment method described here can reduce the protein losses as pre-treatment by LN2 and shown in FIG. 5 can inhibit some of these degradation events thus retaining the high concentration of products in engineered cells. So, this method could potentially help in enhancing the yield of recombinant proteins from plant cell factories. As shown in FIG. 5, the process of LN2 spray (e.g., LN2 501 sprayed via nozzle 502 to form a layer 503) of mammalian cell (e.g., cell 500) to aid in gentler cell disintegration.

Figure 1:
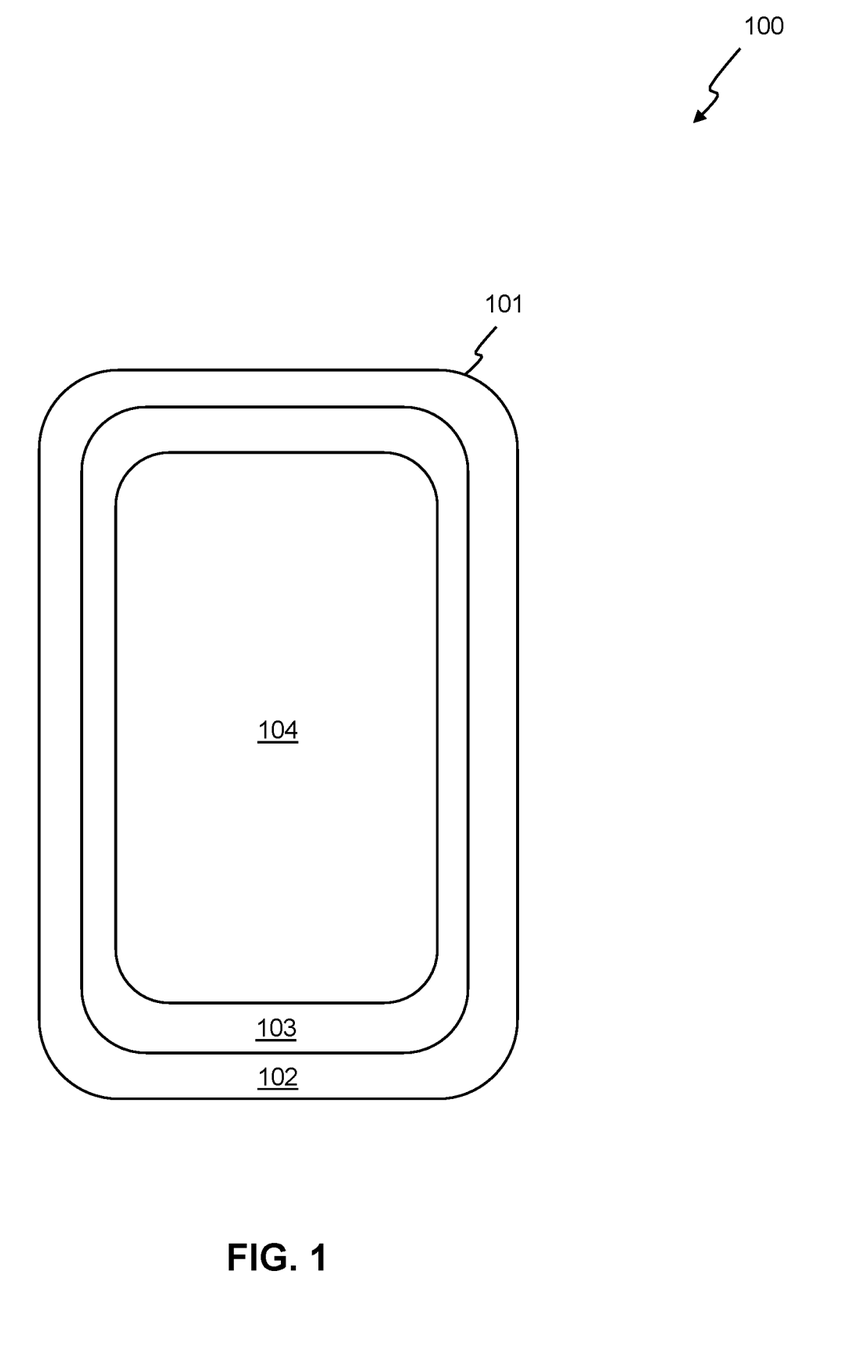
FIG. 1 is a diagram of Cell Wall and cell structure of a type I plant cells
Figure 2:
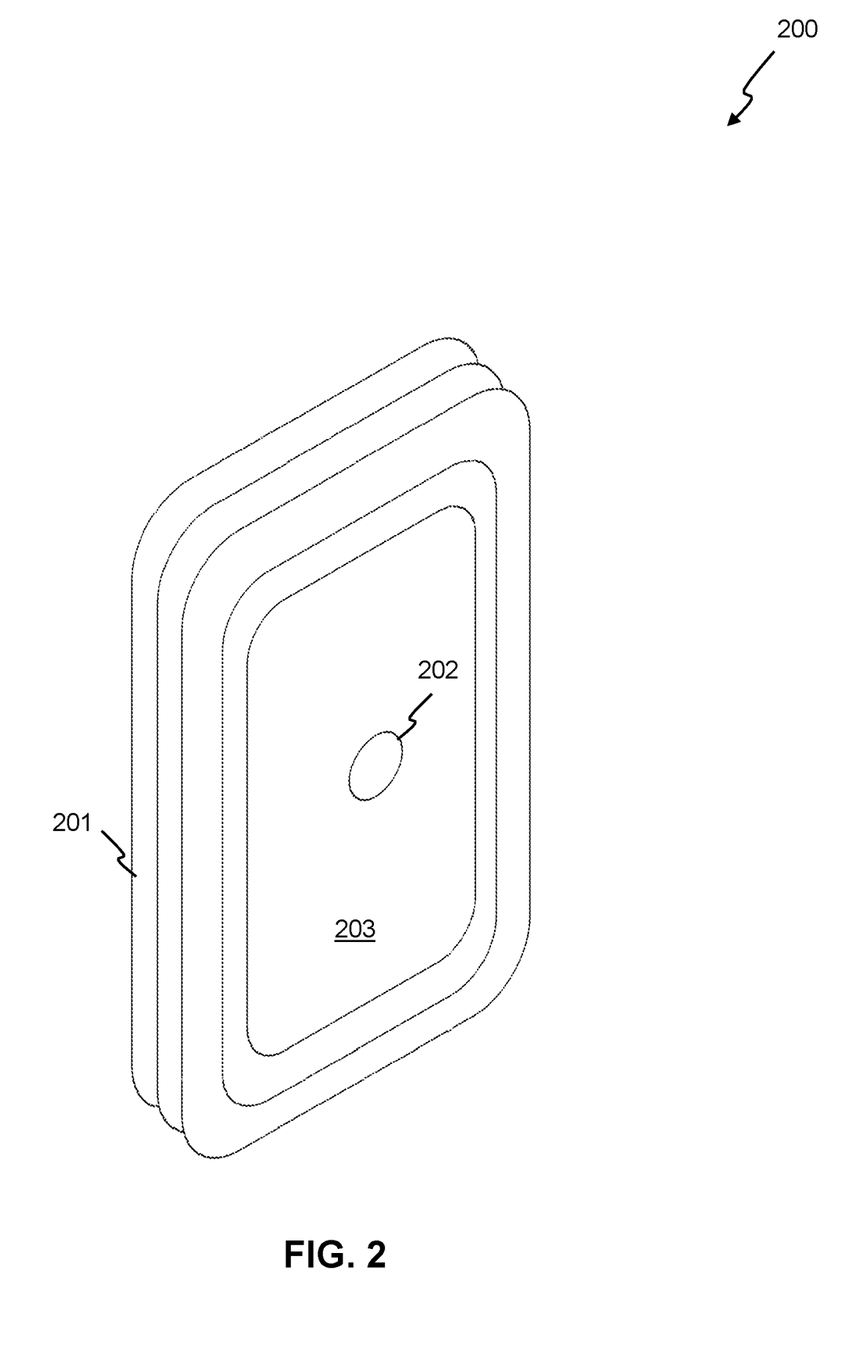
FIG. 2 is a diagram of Cell Wall and cell structure of a type II plant cell
Figure 3:
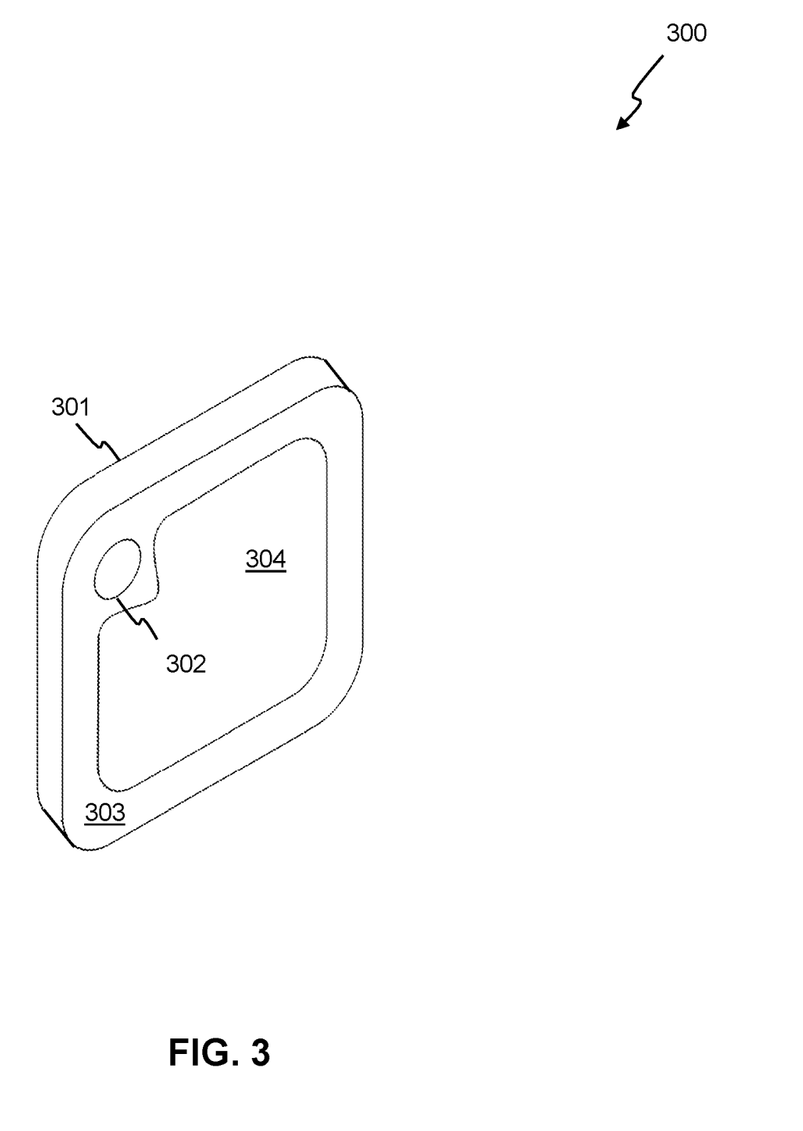
FIG. 3 is a diagram of Cell Wall and cell structure of a type III plant cell
Figure 4:
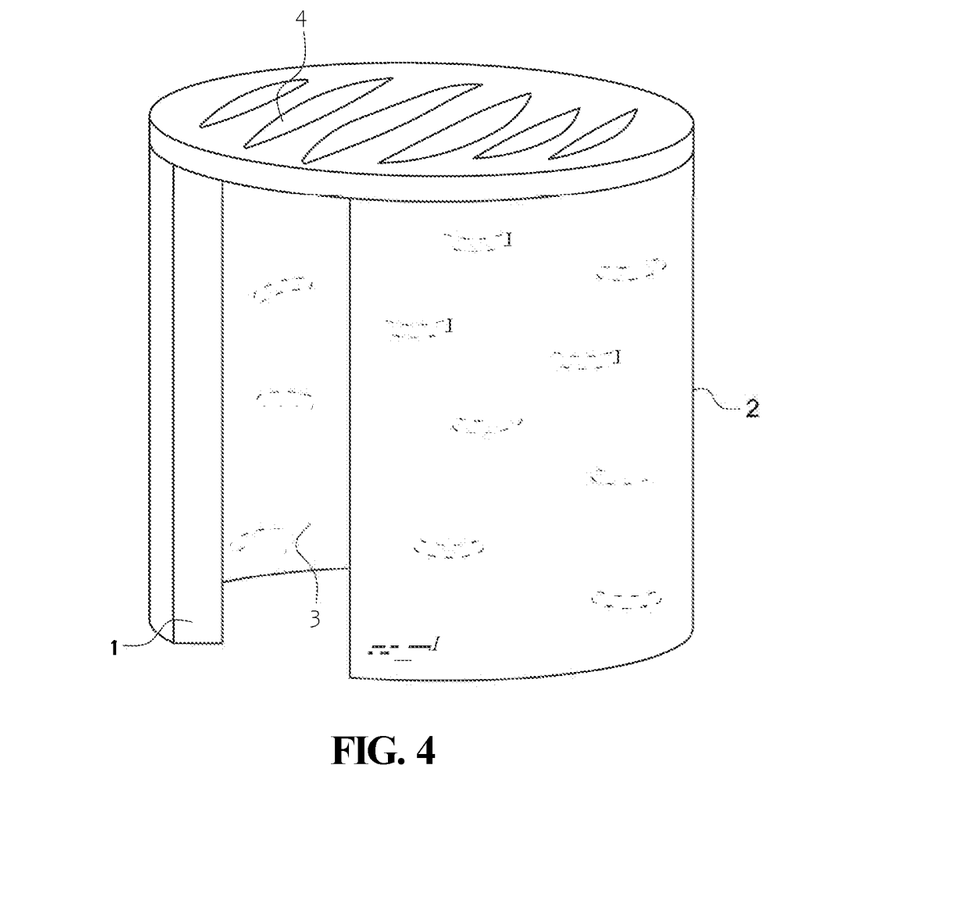
FIG. 4 is a diagram of Cell Wall and cell structure of a type IV plant cell

The outer cell boundary of plant cell factories is an elaborate extracellular matrix that encloses each cell in the plant. Certain type of plant cells is shown in FIG. 1, FIG. 2, FIG. 3 and FIG. 4. Each of these plant cells are surrounded by a tough extracellular matrix in the form of a cell wall. This tough structure is characteristics of plant's life style. The cell wall is composed of a network of cellulose microfibrils and cross-linking glycans embedded in a highly cross-linked matrix of pectin polysaccharides. For example, FIG. 1 depicts an outer boundary 101, an inner boundary 103, and an interior 104 of a type I plant cell wall 102. FIG. 2 depicts an outer boundary 201, a cell nucleus 202, and an interior 203 of a type II plant cell 200. FIG. 3 depicts an outer boundary 301, a cell nucleus 302, and an interior 304 of a type III plant cell 300. FIG. 4 depicts an outer boundary 401, a cell outer boundary 402, and an interior 403, interior organelles 404 of a type IV plant cell 400.

Figure 6:
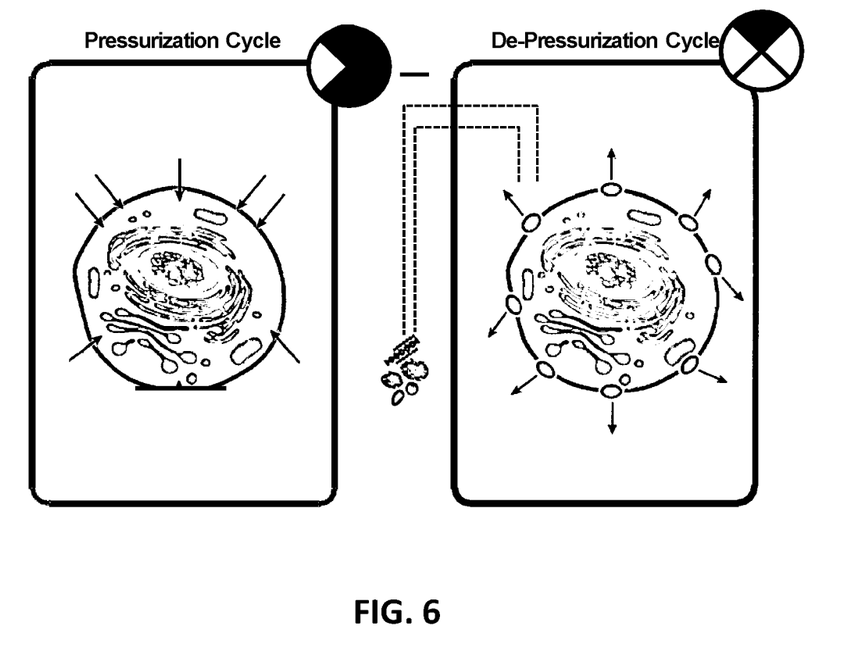
FIG. 6 is a diagram of a tunable pressurization and depressurization of a mammalian cell type with inert nitrogen or argon to accomplish gentler cell disintegration

The gentler and lower pressure batch process configuration of disrupting mammalian or plant cells is described in FIG. 6. This shows that pre-treated cells are charged to a pressure vessel which is then pressurized by inert and high purity gaseous nitrogen or argon to say 500 psi and pressure maintained for certain time for proper dissolution of gas into cellular medium for proper equilibration. After certain equilibration time the vessel is depressurized. The depressurization profile is tunable and depending on the cell type and product type either it could be an abrupt depressurization or a relatively gradual and slower depressurization. The gas shear stresses due to pressure reduction will perturb the cellular structure thus causing a more uniform and gentler disintegration of cellular mass. Such a system will also reduce product losses due to aggregation and degradation and even intact organelles could be recovered to a very high degree of yield as all the cells in a given batch will only see uniform stresses at once in contrast to mechanical homogenization which leads to complete grinding and destruction of any cellular structures thus leading to aggregations of proteins and probably yield losses.

The current biopharmaceutical processing is carried out in batch configuration. Though effective and operational for decades, batch processing is marked with high labor and operational costs as well as lower yields and inconsistences due to batch-to-batch variations. The FIG. 7 describes a continuous process to carry out the cell disruption through LN2-GAN treatments. This figure describes that cells from fermentation batch (1) are carried to storage vessels (2) and (3). The capacity buffer of storage vessels (2 and 3) is such that it is continuously feeding the fermented cells to disruption process through lines (4) and (5). Through line (6) these cells are fed into a hopper (7). This hopper communicates with ribbon screw (8) which allows the gravity feeding of fermented cells to be carried into spray chamber (8). In the spray chamber (8) the LN2 (10) is sprayed through nozzles (9). The LN2 spray (9) on the fermented cells provide a spray cloud which act as a pre-treatment step for cells like plant cells. During the length of chamber (8) the fermented expression systems cells spend enough time in this chamber to be properly pre-treated with LN2(10). At the outlet of chamber (8) the pre-treated cells are gravity fed into an outlet hopper and the outlet hopper communicates with vessel (12), thus filling with pre-treated plant or animal cell. Once vessel is one-third to one-half full with cells it moves to pressurization position (13). In the pressurization position (13) the GAN coming from blower (16) and recycle GAN (11) coming from spray chamber (8) are used to pressurize this vessel (13) to a certain value depending on the cell type and targeted intracellular product. Once pressurization is complete the vessel (13) moves to soaking position (14) where the vessel (14) is allowed for certain time to equilibrate with GAN in the head space of pressurized vessel (14) and cellular materials in the vessel (14). After certain time which is again dependent on cell type and targeted product the vessel (14) moves to depressurization position (15) in the sequence. In the depressurization position (15) the pressure from vessel is removed. The de-pressurization profile is also controlled by the specific cell type and targeted product. The GAN is recovered by blower (16) suction line and is recycled whereas, the cellular material which has gone through dis-integration are charged on gravity hopper and through it on a conveyor belt (17) which communicates with polishing step (18). This scheme provides a continuous method to carry the cell dis-integration thus providing a higher yield system and offers much lower cost even for cellular systems with tough external walls such as plant cells or algal cells.

Figure 8:
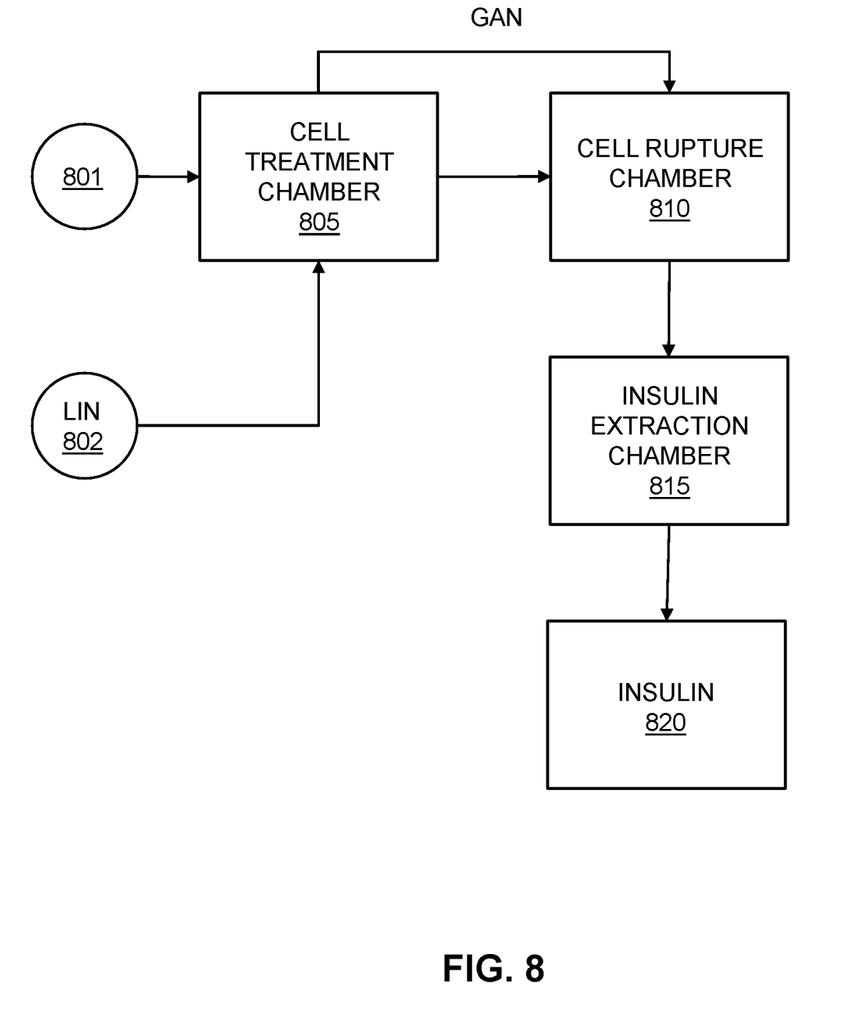
FIG. 8 is a diagram of LN2-GAN System for insulin production from yeast cells.

Producing Insulin using *E. coli* expression system has certain disadvantages, such as loss of plasmid and antibiotic property, unsolicited inducers for gene expression, intracellular accumulation of heterologous proteins as inclusion bodies, improper protein refolding, lack of pos-translational modification, protein-mediated metabolic burden and stress, endotoxin contamination, poor secretion, proteolytic digestion and complexity in downstream processing. Thus, it seems that yeast expression system would provide a better expression system for production of insulin compared to *E. coli* and mammalian cell systems due to cost and quality of insulin obtained. Yeast based systems grow rapidly and are very easy to handle and amenable to various genetic manipulations. The recombinant insulin produced in yeast could be very similar to produce in mammalian cells. Yeast cells like *Saccharomyces cerevisiae* has been extensively used to produce recombinant insulin since early 1980 and large production of recombinant insulin are produced by this yeast expression system. Though this yeast system is characterized by very tough cell walls which require extensive treatment like high pressure press to rupture these walls and then another high pressure or chemical-based system to extract the insulin out of ruptured cells. The current methods are slow and are characterized by poor yield. In the FIG. 8 it is shown that yeast cell (e.g., cell 801) can be pre-treated with LN2 (e.g., LIN 802), the pre-treatment with LN2 (e.g., within a cell treatment chamber 805) will softens the cell walls of insulin bearing *Saccharomyces cerevisiae* and the treated cells are then treated with GAN through a pressure and depressurization cycle (e.g., within a cell rupture chamber 810) thus providing a shock wave stimulation for gentler and more complete extraction of insulin (e.g., intracellular product 820) from the yeast cells (e.g., within an insulin extraction chamber 815) without losing the quality. This combine LIN-GAN based system could be economical, scalable, faster and efficient in producing insulin from yeast-based cell factories.

The yeast *Phaffia rhodozyma* can be used for producing carotenogenic pigments, commonly used in aquaculture feed formulation as well as in cosmetic, pharmaceutical, and food industries. The production of carotenoids is hindered due to the cell wall resistance which creates a barrier to the bioavailability. There is a need to enhance the recovery of carotenoids from microorganisms for the food applications. Carotenoids are natural pigments responsible for yellow, orange, and red in many foods such as fruits, vegetables, egg yolks, and fish like salmon and shellfish. Besides coloring, carotenoids have important biological activity due to their provitamin A activity and properties resulting in potential health benefits such as strengthening the immune system and decreasing the risks of degenerative diseases. Furthermore, carotenoids have antioxidant action by neutralizing free radicals as electron donors.

Thus, antioxidants prevent the damage caused on living cells by free radicals. Interest in carotenoids has recently increased due to the growing demand for such compounds in pharmaceutical, cosmetic, food, and feed industries. The global market demand for carotenoids grows 2.9% per year, with estimated annual sales of about US$ 300 million in synthetic carotenoids. Commercial production of carotenoids from microorganisms competes mainly with the synthetic production by chemical procedures. Carotenoids used industrially are mainly obtained chemically or by extraction of plants or algae. However, due to the concern about the use of chemical additives in foods, there is increasing interest in carotenoids naturally obtained by biotechnological processes. Therefore, the yeast *Phaffia rhodozyma* stands out as a natural source of carotenoids. Carotenoids synthesized by *P. rhodozyma* are of intracellular kind, which hampers their use as an additive color on an industrial scale due to cell wall. There is a need for effective, faster and higher rate cell disruption which can adequately recover the carotenoids produced. Since the cell wall composition of the yeast *P. rhodozyma* has β-glucose, α-glucose, and a complex heteropolysaccharide consisting of L-arabinose, D-xylose, D-glucuronic acid, and D-galactose, the method described in FIG. 7 based on LN2 and GAN is effective in disrupting the cell wall of this yeast thus providing higher recovery rates for carotenoids.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values or value range endpoints are provided for embodiments, additional embodiments are described by taking any 2 different values as the endpoints of a range or by taking two different range endpoints from specified ranges as the endpoints of an additional range. Such ranges are also within the scope of the described invention. Further, specification of a numerical range including values greater than one includes specific description of each integer value within that range.

Thus, additional embodiments are within the scope of the invention and within the following claims.

What is claimed is:

1. A continuous process of stimulating the recovery of intercellular products from cell factories comprising:
   continuously feeding cell factories into a spray chamber that transports the cell factories to a vessel communicatively coupled to the spray chamber;
   spraying the cell factories within the spray chamber with a liquid inert gas in a manner to produce a spray cloud and allow the liquid inert gas to absorb into the cell wall;
   pressurizing the vessel with a gaseous inert gas in a manner that allows dissolution of the gaseous inert gas into the cell factories; and
   depressurizing the vessel to thereby form intercellular products and cellular debris.

2. The process of claim 1, wherein
spraying the cell factories with the liquid inert gas comprises capturing a second gaseous inert gas that results from the liquid inert gas.

3. The process of claim 2, wherein
the gaseous inert gas comprises the second gaseous inert gas.

4. The process of claim 2, wherein
depressurizing the vessel comprises capturing a third gaseous inert gas positioned therein; and
the third gaseous inert gas comprises the gaseous inert gas and/or the second gaseous inert gas.

5. The process of claim 1, wherein
the spray chamber transports the cell factories via a helical screw or a conveyor belt.

6. The process of claim 1, wherein the cell factories comprise:
   bacterial cells;
   microalgae cells;
   plant cells;
   mammalian cells;
   insect cells; and/or
   yeast cells.

7. The process of claim 1, wherein
the vessel comprises a plurality of vessels that each comprise:
   a filling position;
   a pressurization position;
   a soaking position;
   a depressurization position;
each vessel alternates between the filling position, the pressurization position, the soaking position, and the depressurization position; and
continuously feeding cell factories into the spray chamber comprises transporting the cell factories to each vessel.

8. The process of claim 7, wherein
when in the filling position, the vessel receives the cell factories from the spray chamber.

9. The process of claim 7, wherein
when in the pressurization position, the vessel is pressurized with the gaseous inert gas.

10. The process of claim 7, wherein
when in the soaking position, the gaseous inert gas is allowed to dissolve into the cell factories.

11. The process of claim 7, wherein
when in the depressurization position, the vessel is depressurized.

12. The process of claim 1, wherein
the cell factories are sprayed with the liquid inert gas at atmospheric pressure and at a temperature between −40° C. to 10° C.

13. The process of claim 1, wherein
the vessel is pressurized with the gaseous inert gas at room temperature and at 100 psi, 200 psi, 300 psi, 400 psi, 100-500 psi, 500 psi, or 600-900 psi.

14. The process of claim 1, wherein
the depressurization is accomplished in 5 minutes, 10 minutes, 15 minutes, or 15-30 minutes.

15. The process of claim 1, wherein the intracellular products comprise:
   a biopharmaceuticals;
   a lipid;
   a biofuel;
   a cellular organelle;
   a carotenoid;
   a nucleic acid; and/or
   a protein.

16. The process of claim 1, wherein
the liquid inert gas and/or the gaseous inert gas comprises;
   helium;
   Argon; and/or
   Nitrogen.

17. A continuous process of stimulating the recovery of intercellular products from cell factories comprising:
   continuously feeding cell factories into a spray chamber that transports the cell factories to a vessel, the vessel is communicatively coupled to the spray chamber, the spray chamber transports the cell factories via a helical screw or a conveyor belt;
   within the spray chamber,
      spraying the cell factories with a liquid inert gas in a manner to produce a spray cloud and allow the liquid inert gas to absorb into the cell wall; and
      capturing a second gaseous inert gas that results from the liquid inert gas;
   within the vessel, pressurizing the vessel with a gaseous inert gas in a manner that allows dissolution of the gaseous inert gas into the cell factories, the gaseous inert gas comprises the second gaseous inert gas; and depressurizing the vessel to thereby form intercellular product and cellular debris by capturing a third gaseous inert gas positioned therein, the third gaseous inert gas comprises the gaseous inert gas and/or the second gaseous inert gas.

18. The process of claim 17, wherein
the vessel comprises a plurality of vessels that each comprise:
- a filling position;
- a pressurization position;
- a soaking position;
- a depressurization position;

each vessel alternates between the filling position, the pressurization position, the soaking position, and the depressurization position;

continuously feeding cell factories into the spray chamber comprises transporting the cell factories to each vessel;

when in the filling position, the vessel receives the cell factories from the spray chamber;

when in the pressurization position, the vessel is pressurized with the gaseous inert gas;

when in the soaking position, the gaseous inert gas is allowed to dissolve into the cell factories; and when in the depressurization position, the vessel is depressurized.

19. The process of claim 18, wherein
the cell factories comprise:
- bacterial cells;
- microalgae cells;
- plant cells;
- mammalian cells;
- insect cells; and/or
- yeast cells.

20. The process of claim 19, wherein
the intracellular products comprise:
- a biopharmaceutical;
- a lipid;
- a biofuel;
- a cellular organelle;
- a carotenoid;
- a nucleic acid; and/or
- a protein.

* * * * *